(12) United States Patent
Lee et al.

(10) Patent No.: US 10,185,391 B2
(45) Date of Patent: Jan. 22, 2019

(54) FACIAL RECOGNITION DISPLAY CONTROL METHOD AND APPARATUS

(71) Applicant: Samsung Electronics Co., Ltd., Suwon-si, Gyeonggi-do (KR)

(72) Inventors: Wooyong Lee, Hwaseong-si (KR); Gyuhee Han, Seoul (KR); Kwangkyu Park, Suwon-si (KR); Seungjoon Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 14/209,399

(22) Filed: Mar. 13, 2014

(65) Prior Publication Data

US 2014/0267021 A1   Sep. 18, 2014

(30) Foreign Application Priority Data

Mar. 14, 2013   (KR) .................. 10-2013-0027592
Mar. 5, 2014    (KR) .................. 10-2014-0025929

(51) Int. Cl.
*G06F 3/01*   (2006.01)
*G06F 3/03*   (2006.01)
*G06F 1/32*   (2006.01)

(52) U.S. Cl.
CPC ............ *G06F 3/013* (2013.01); *G06F 1/325* (2013.01); *G06F 1/3212* (2013.01); *G06F 1/3231* (2013.01); *G06F 3/012* (2013.01); *G06F 3/0304* (2013.01); *Y02D 10/173* (2018.01); *Y02D 10/174* (2018.01)

(58) Field of Classification Search
CPC ........ G06F 3/013; G06F 3/0304; G06F 3/012; G06F 1/3231; G06F 1/325; G06F 1/3212; Y02B 60/1292; Y02B 60/1289
See application file for complete search history.

(56) References Cited

U.S. PATENT DOCUMENTS

| | | | |
|---|---|---|---|
| 2004/0175020 A1 | 9/2004 | Bradski et al. | |
| 2005/0276481 A1 | 12/2005 | Enomoto | |
| 2010/0259814 A1* | 10/2010 | Boyer ................. | F41J 2/00 359/359 |
| 2011/0006978 A1 | 1/2011 | Yuan | |
| 2011/0134250 A1 | 6/2011 | Kim et al. | |
| 2012/0033853 A1 | 2/2012 | Kaneda et al. | |
| 2012/0062729 A1* | 3/2012 | Hart ................. | G06F 1/1626 348/135 |
| 2012/0256967 A1* | 10/2012 | Baldwin ............. | G06F 3/013 345/684 |
| 2012/0293406 A1 | 11/2012 | Park et al. | |

FOREIGN PATENT DOCUMENTS

| | | |
|---|---|---|
| EP | 2 416 280 A1 | 2/2012 |
| GB | 2460580 A | 12/2009 |
| JP | 2009-301166 A | 12/2009 |
| RU | 2522848 C1 | 7/2014 |

* cited by examiner

*Primary Examiner* — Temesghen Ghebretinsae
*Assistant Examiner* — Yaron Cohen
(74) *Attorney, Agent, or Firm* — Jefferson IP Law, LLP

(57) ABSTRACT

A screen display control method is provided for controlling screen display of an electronic device more efficiently. A screen display control method includes determining a resolution of a camera, recognizing a face of a user using the camera operating at the determined resolution, and controlling screen display of the electronic device based on the face.

15 Claims, 12 Drawing Sheets

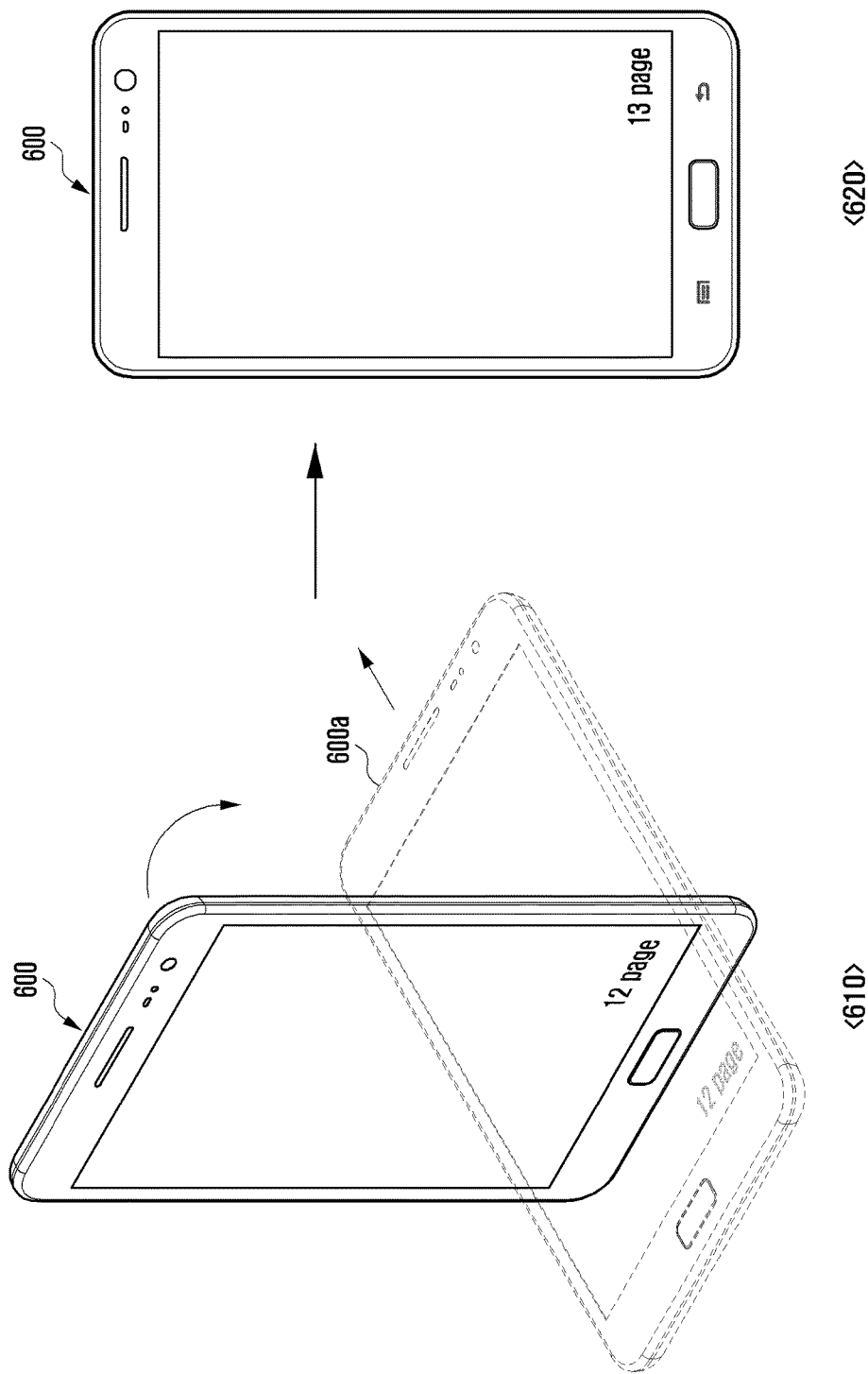

FACIAL RECOGNITION DISPLAY CONTROL METHOD AND APPARATUS

CROSS-REFERENCE TO RELATED APPLICATION(S)

This application claims the benefit under 35 U.S.C. § 119(a) of a Korean patent application filed on Mar. 14, 2013 in the Korean Intellectual Property Office and assigned Serial No. 10-2013-0027592, and of a Korean patent application filed on Mar. 5, 2014 in the Korean Intellectual Property Office and assigned Serial No. 10-2014-0025929, the entire disclosure of each of which is hereby incorporated by reference.

TECHNICAL FIELD

The present disclosure relates to a method for controlling screen display of an electronic device efficiently.

BACKGROUND

With advances in information, communication, and semiconductor technologies, the popularity and use of electronic devices continues to increase. Particularly, a mobile terminal is integrating various features of other electronic devices beyond the voice telephony and messaging functions. For example, the mobile terminal may now include various advanced functions including a TV playback function (e.g. a mobile broadcasting playback function such as Digital Multimedia Broadcasting (DMB) and Digital Video Broadcasting (DVB)), a music playback function (e.g. MPEG Audio Layer-3 (MP3) playback function), a picture shooting function, a data communication function, an Internet Access function, a short range wireless communication function, etc.

Also, the mobile terminal is equipped with various sensors as well as a camera to extend its functionality. For example, a camera-equipped mobile terminal is capable of recognizing a face from an image taken by the camera and tracking the gaze of the user. However, the electronic device of the related art lacks functionality in view of power utilization efficiency. Accordingly, there is a need for an improved apparatus and method for controlling the display of an electronic device in view of power demands.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display control method and apparatus of an electronic device that is capable of controlling the screen display of an electronic device depending on the power state of the electronic device or the presence/absence of the user regardless of the power state, thereby improving power utilization efficiency of the electronic device.

In accordance with an aspect of the present disclosure, a screen display control method of an electronic device is provided. The screen display control method includes determining a resolution of a camera, recognizing a face of a user using the camera operating at the determined resolution, and controlling screen display of the electronic device based on the face.

In accordance with another aspect of the present disclosure, an electronic device is provided. The electronic device includes a control unit configured to determine a resolution, a camera configured to operate at the resolution determined by the control unit to recognize a face of a user, and a display unit configured to display a screen under a control of the control unit based on the recognized face.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A and 6B are diagrams illustrating a situation of controlling screen display according to an embodiment of the present disclosure.

The same reference numerals are used to represent the same elements throughout the drawings.

DETAILED DESCRIPTION

Figure 1:
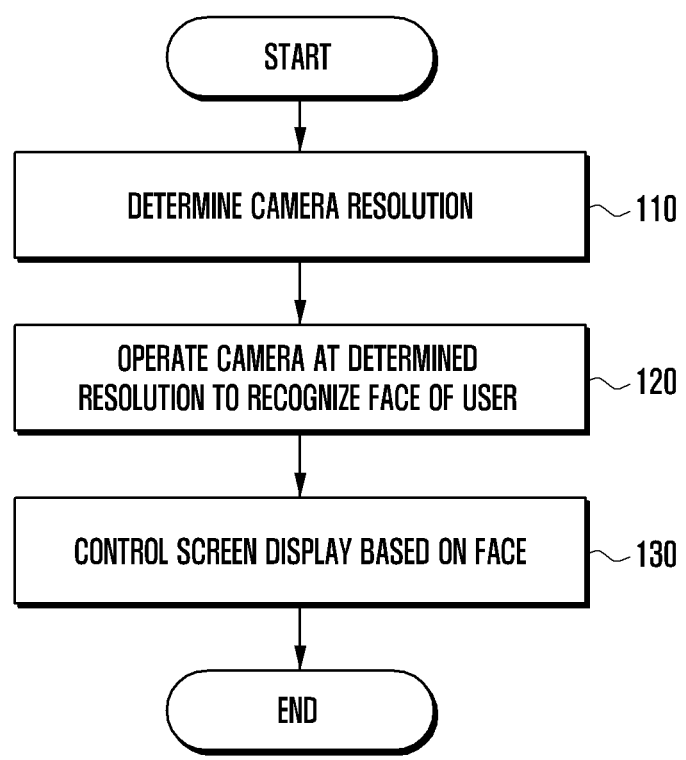
FIG. 1 is a flowchart illustrating a screen display control method according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

According to an embodiment of the present disclosure, the electronic device may be a device equipped with a communication function. Examples of the electronic device include a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), MP3 player, a mobile medical appliance, a camera, and a wearable device (e.g. a Head-Mounted-Device (HMD) such as electronic glasses, electronic clothing, an electronic bracelet, an electronic necklace, an electronic appcessory, an electronic tattoo, a smart watch, etc.

According to an embodiment of the present disclosure, the electronic device may be a smart home appliance equipped with a communication function. Examples of the smart home appliance include a television, a Digital Video Disk (DVD) player, an audio device, a refrigerator, an air-conditioner, a vacuum cleaner, an oven, a microwave oven, a laundry machine, an air cleaner, a set-top box, a TV box (e.g. Samsung HomeSync™, Apple TV™, and Google TV™), a game console, an electronic dictionary, an electronic key, a camcorder, an electronic frame, etc.

According to an embodiment of the present disclosure, examples of the electronic device include various medical appliances (e.g. Magnetic Resonance Angiography (MRA), Magnetic Resonance Imaging (MRI), Computed Tomography (CT) camera, and ultrasonic device), a navigation device, a Global Positioning System (GPS) receiver, an Event Data Recorder (EDR), a Flight Data Recorder (FDR), a car infotainment device, a marine electronic device (e.g. marine navigation device and gyro compass), an avionics device, a security device, industrial and home robots, etc.

According to an embodiment of the present disclosure, examples of the electronic device include furniture or part of building/construction which is equipped with a communication function, an electronic board, an electronic signature receiving device, a projector, a metering device (e.g. water, electricity, gas, and electric wave metering devices). The electronic device according to an embodiment of the present disclosure may be any combination of at least two of the above-enumerated devices. It is obvious to those skilled in the art that the electronic device of the present disclosure is not limited to the above-enumerated devices.

FIG. 1 is a flowchart illustrating a screen display control method according to an embodiment of the present disclosure. The screen display control method according to an embodiment of the present disclosure is executed by an electronic device.

Referring to FIG. 1, at operation 110, the electronic device may determine the resolution of a camera. The resolution denotes a degree indicating how many pixels or dots are used for presenting the image. For example, the electronic device may accomplish the 'high resolution' by activating all of the pixels of the image sensor of the camera and the 'low resolution' by activating a part of the pixels of the image sensor. The electronic device may determine the resolution of the camera regardless of or depending on the power state. In an embodiment, the electronic device may set the resolution of the camera to high or low regardless of the power state.

In another embodiment, the electronic device may set the resolution of the camera to high or low depending on its power state. For example, if the power of the electronic device is equal to or greater than a threshold, the electronic device determines the current state as the high power state and sets the camera resolution to high. Otherwise if the power of the electronic device is lower than the threshold, the electronic device determines the current state as the low power state and sets the camera resolution to low. Here, the threshold may be expressed as the percentage of the residual power of the electronic device and may be variously set, such as to 30%, 40%, 50%, or 60% of the battery capacity. The threshold may be set to a default value by the electronic device or to a certain value by the user. For example, if the threshold value is set to 30% of the battery capacity, the electronic device determines the residual power state of 30% as a high power state and the residual power state of 29% as a low power state.

If the electronic device is connected to an external device, it determines its state as the high power state and sets the camera resolution to high. If the electronic device is not connected to the external device and if its power state is low, it sets the camera resolution to low. The external device is a device supplying power to the electronic device, for example through a Universal Serial Bus (USB) or a node such as a PIN CONNECTOR. In this case, since the external device supplies power to the electronic device, the electronic device determines its power state as the high power state regardless of the residual power. Otherwise, if the external device with low residual power is not connected to the external device, it determines that its state is the low power state.

At operation 120, the electronic device activates the camera with the determined resolution to recognize the face of the user. As an example, face recognition recognizes the face or gaze of the user to determine whether it is the front of the user's face or a side of the user's face and recognizes the distorted degree of the face.

According to various embodiments, the electronic device may accomplish the 'high resolution' by activating all of the pixels of the image sensor of the camera and the 'low resolution' by activating a part of the pixels of the image sensor. Assuming that the total number of pixels of the image sensor is 10 million pixels, the electronic device sets a threshold to 5 million. The electronic device may determine the number of pixels equal to or greater than the threshold as 'high resolution' and the number of pixels less than the threshold as 'low resolution.'

At operation 130, the electronic device may control the screen display of the electronic device based on the recognized face. According to various embodiments, the electronic device operates the camera with high resolution to acquire the gaze position of the user and controls the screen display based on the gaze position. The electronic device also may operate the camera with low resolution to determine the presence/absence of the user and if it is determined that a user is present, change configuration values of the camera to recognize the face position of the user and control the screen display based on the face position.

The electronic device may control at least one action associated with the screen displayed on the display unit such as scroll, playback, pause, zoom-in, zoom-out, stay, and response based on the recognized face. The term scroll denotes a screen control of scrolling up, down, left, and right. The term playback denotes a screen control of playing music or motion picture on the screen. The term pause denotes a screen control of pausing the music and motion picture. The term zoom-in denotes a screen control of zooming in the screen, and the term zoom-out denotes a screen control of zooming out the screen. The term stay denotes a screen control of maintaining the screen as turned on, and the term response denotes controlling the screen according to the user response to an incoming call or message. As an example, the user response may be one of receiving and rejecting the incoming call, determining whether to view a message or not, and the like.

According to an embodiment, when the electronic device is connected to an external device, it is possible to use the power without restriction and thus to operate the camera at the maximum frame rate to improve the user recognition probability. The electronic device may further support a monitoring function, a fire protection function, and an emergency situation recoding function.

Figure 2:
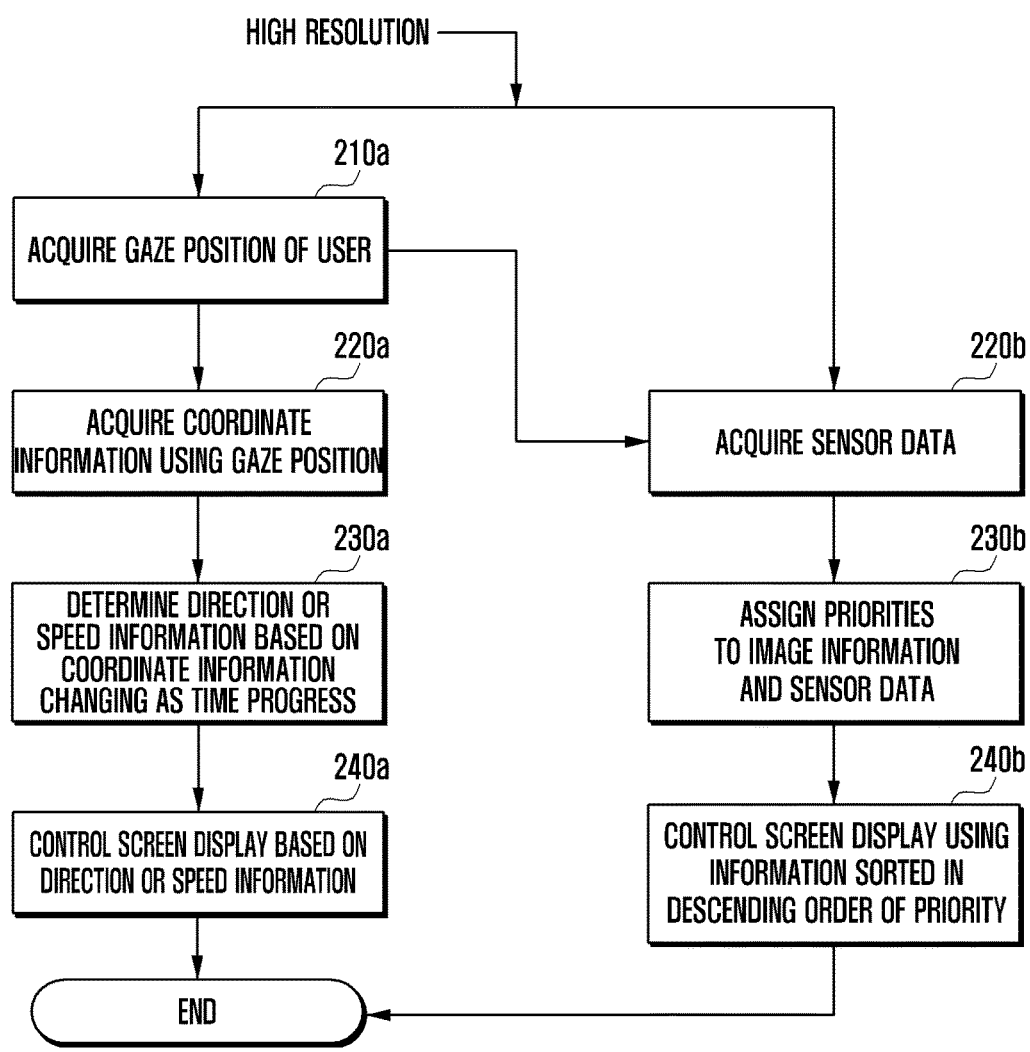
FIG. 2 is a flowchart illustrating a screen display control procedure of an electronic device equipped with a high resolution camera according to an embodiment of the present disclosure.

FIG. 2 is a flowchart illustrating a screen display control procedure of an electronic device equipped with a high resolution camera according to an embodiment of the present disclosure.

Referring to FIG. 2, at operation 210a, the electronic device acquires the gaze position of the user using the high resolution camera. The camera may be arranged at the front or rear side of the electronic device to capture a surrounding scene, an object, or a person. The captured image information is sent to the control unit of the electronic device and stored in the electronic device. The camera may be an infrared camera or other type of camera. The high resolution camera is a camera capable of operating in a high resolution mode capable of being configured with high resolution color values to recognize a user's face and track the gaze position of the user simultaneously or sequentially. For example, the electronic device is capable of recognizing a user's face by combining the orientations of the pupils of the user's face to determine the gaze position.

At operation 220a, the electronic device acquires coordinate information by mapping the gaze position to the display unit of the electronic device. The electronic device may also acquire the coordinate information of the gaze position on the display unit which corresponds to the gaze position. According to various embodiments, the electronic device may control the screen display of the electronic device based only on the acquired coordinate information. However, since the gaze position of the user varies over time, the electronic device determines a movement direction or a movement speed of the coordinate information to control the screen display more accurately.

At operation 230a, the electronic device determines direction information or speed information based on the change of the coordinate information over time. The electronic device is capable of determining the direction information or the speed information based on the initially acquired gaze position and the changed gaze position if the gaze position changes over time since the initial recognition of the gaze. According to various embodiments, the electronic device may compensate the direction information and the speed information using sensor data acquired by means of a sensor.

At operation 240a, the electronic device controls the screen display based on the direction or speed information. For example, if the screen display control is "scroll", the direction or speed information may affect the scroll direction and/or scroll speed.

In another embodiment, the electronic device is capable of acquiring the sensor data using a sensor at operation 220b. The sensor may include at least one of a Motion Sensor, a Gyro Sensor, an Acceleration Sensor, a Humidity Sensor, a Proximity Sensor, an Infrared Sensor, an Illuminance Sensor, an Earth Magnetic Field Sensor, an Inertial Sensor, a Tilt Sensor, and a Blow Sensor (e.g., an exhale sensor). The sensor may acquire the sensor data including at least one or any combination of an angle change, a direction change, a position change, a posture change, a strength change, and a speed change. The sensor detects a motion event occurred by the user so as to acquire the sensor data from at least one or any combination of a pinch zoom, a hand blade touch, and an air motion. For reference, the blow sensor is capable of detecting a blow of the user, and the sound detection sensor such as a speaker is capable of detecting the blow sound.

At operation 230b, the electronic device may assign the priority of the image information and the sensor data. Here, the image information is the information acquired by the camera such as a gaze position. For example, if the camera is a high resolution camera, the electronic device may set the priority of the image information to a value higher than that of the sensor data. If the camera is a low resolution camera, the electronic device may set the priority of the image information to a value lower than that of the sensor data.

At operation 240b, the electronic device controls the screen display using the information sorted in a descending order of priority. For example, if the priority of the image information is high, the electronic device may control the screen display based on the image information. Otherwise, if the priority of the sensor data is high, the electronic device may control the screen display based on the sensor data. For example, if the priority of the sensor data is higher than that of the image information, the electronic device may control the screen display based on the sensor data. The image information may be reflected after the sensor data-based screen display control or used for compensating the sensor data.

Figure 3:
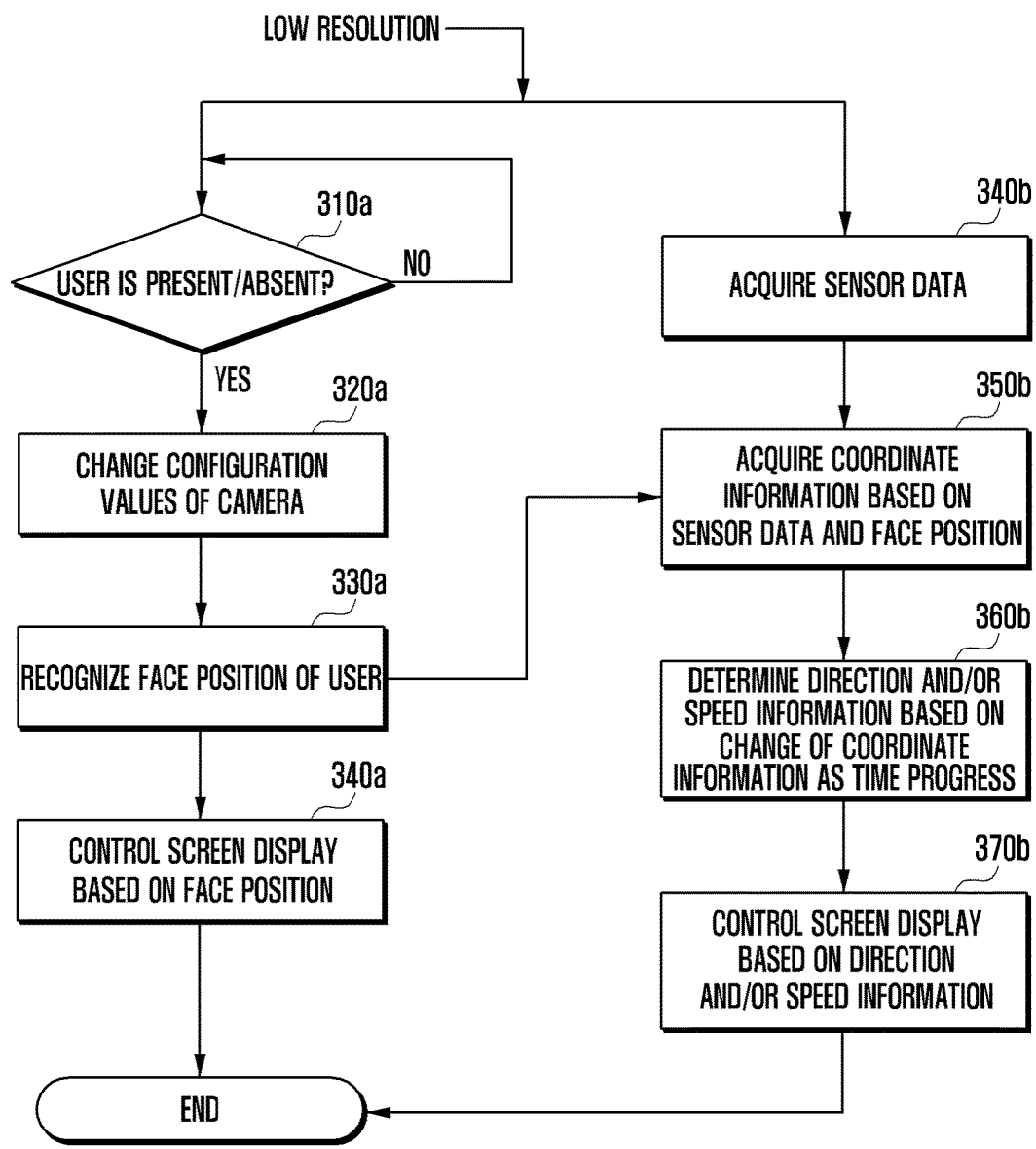
FIGS. 3 and 4 are flowcharts illustrating screen display control procedures using a low resolution camera according to an embodiment of the present disclosure.
Figure 4:
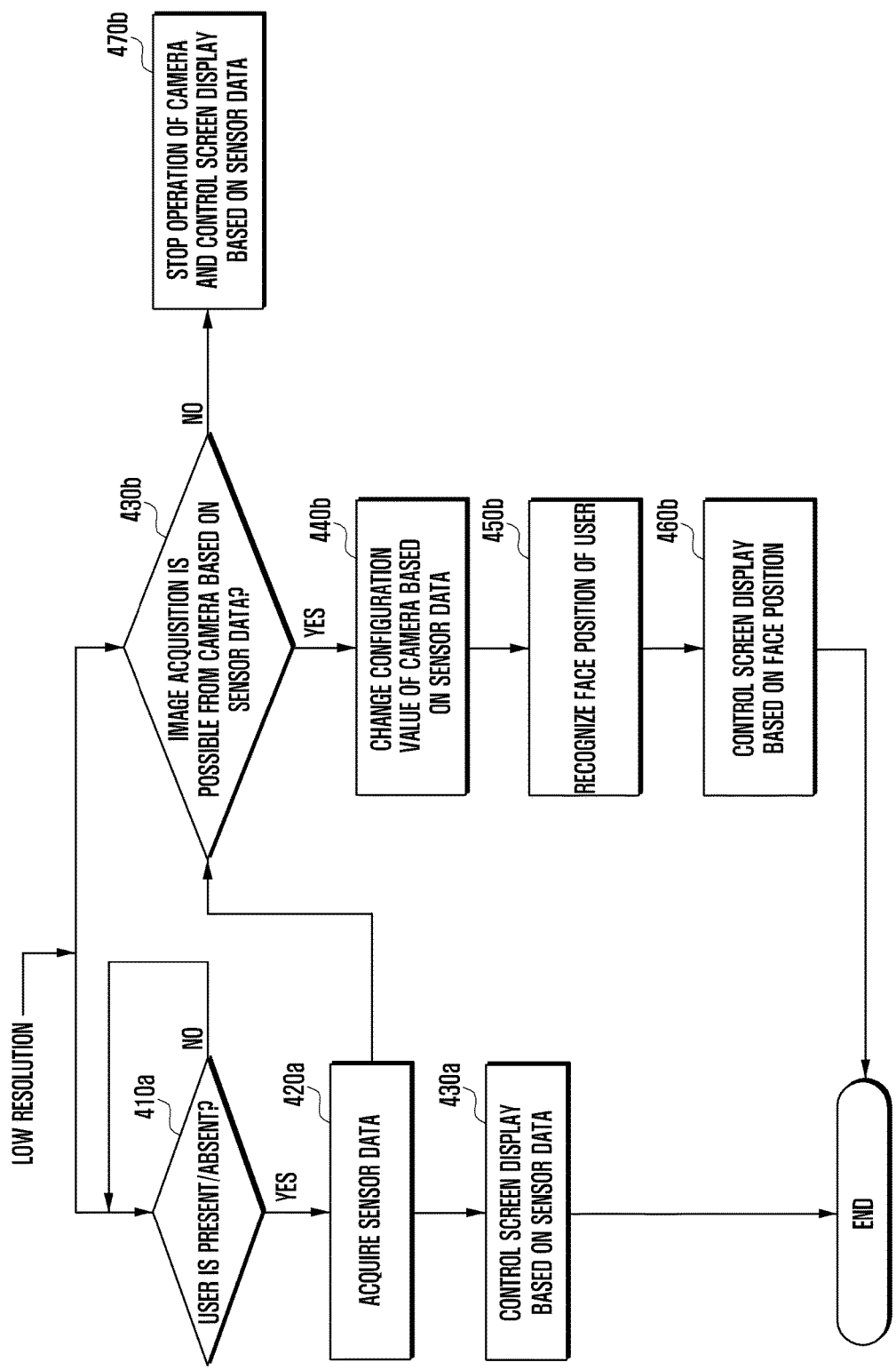

FIGS. 3 and 4 are flowcharts illustrating screen display control procedures using a low resolution camera according to an embodiment of the present disclosure.

Referring to the embodiment of FIG. 3, the electronic device determines whether the user is present or absent using the low resolution camera at operation 310a. The low resolution camera is a camera operating in a low resolution mode implemented by setting configuration values to low resolution black and white values. The electronic device consumes low power in the low resolution mode as compared to the high resolution mode.

If it is determined that the user is present, the electronic device changes the configuration value of the camera at operation 320a. Again, the camera is operating as a low resolution camera. The configuration value may be any of camera speed, i.e., Frames Per Second (FPS), and International Organization for Standardization (IOS). The electronic device also may change at least one of a diaphragm of camera, a shutter speed, an Exposure Value (EV), a White Balance (WB), and an exposure time. The electronic device is capable of increasing the recognition rate of the camera by changing the configuration values of the camera.

At operation 330a, the electronic device recognizes the face position of the user using the camera with the changed configuration values. The face position may be the position where the user's face is located.

At operation 340a, the electronic device controls the screen display of the electronic device based on the face position.

In another embodiment, the electronic device acquires the sensor data using at least one sensor at operation 340b. Since the sensor and the sensor data are identical with those described with reference to FIG. 2, a description thereof is omitted herein. For reference, the electronic device may determine whether the illuminance is sufficient to recognize a face by means of the camera based on the sensor data of the illuminance sensor. The electronic device may determine whether to perform image processing when the camera is running in the call processing based on the sensor data of the proximity sensor. The electronic device may also determine whether it is possible to acquire information consistently from the camera due to the upside-down posture or significant trembling of the electronic device based on the sensor data of the motion sensor.

At operation 350b, the electronic device acquires the coordinate information by mapping the sensor data and face position to the display unit of the electronic device. The electronic device may acquire the coordinate information on the position of the display unit which corresponds to the gaze position. According to various embodiments, the electronic device may control the screen display of the electronic device based only on the acquired coordinate information.

At operation 360b, the electronic device determines the direction and speed based on a change of the coordinates over time. If the gaze position changes over time since the gaze position has been detected, the electronic device may determine the movement direction or speed of the gaze position using the initial gaze position and the changed gaze position. According to various embodiments, the electronic device may compensate the direction information and/or the speed information using the sensor data acquired by the sensor.

At operation 370b, the electronic device may control the screen display based on the direction information and/or the speed information.

Referring to FIG. 4, the electronic device determines whether the user is present or absent using the low resolution camera at operation 410a.

If it is determined that the user is present, the electronic device acquires the sensor data using the sensor at operation 420a.

At operation 430a, the electronic device controls the screen display based on the sensor data. Accordingly, the electronic device can control the screen display based on only the sensor data. The electronic device may control the screen display using the information on the face position recognized using the low resolution camera along with the sensor data.

In an embodiment, the electronic device determines whether it is possible to acquire an image from the camera based on the sensor data at operation 430b. The electronic device analyzes the sensor data acquired from the illuminance sensor to determine whether the ambient illuminance is equal to or greater than a threshold and thus whether it is possible to acquire an image using the camera. The electronic device may analyze the sensor data from the proximity sensor to determine whether the distance from the face position of the user is within a threshold distance and thus whether it is possible to acquire an image using the camera.

If it is determined that the image acquisition is possible, the electronic device changes the configuration value of the camera based on the sensor data at operation 440b. The configuration value may be the camera speed, i.e. FPS, or camera sensitivity.

At operation 450b, the electronic device may recognize the face position of the user using the camera configured with the changed configuration value.

At operation 460b, the electronic device controls the screen display based on the face position of the user.

Otherwise if it is determined that the image acquisition is impossible, the electronic device stops the operation of the camera and controls the screen display based on the sensor data at operation 470b. That is, the electronic device may control the screen display based on only the sensor data.

FIGS. 5A to 5E are diagrams illustrating screen displays for explaining a screen display control method according to an embodiment of the present disclosure.

Referring to FIGS. 5A to 5E, the electronic device 500 may operate the camera in one of the low and high resolution modes depending on or independently of the power state.

Figure 5A:
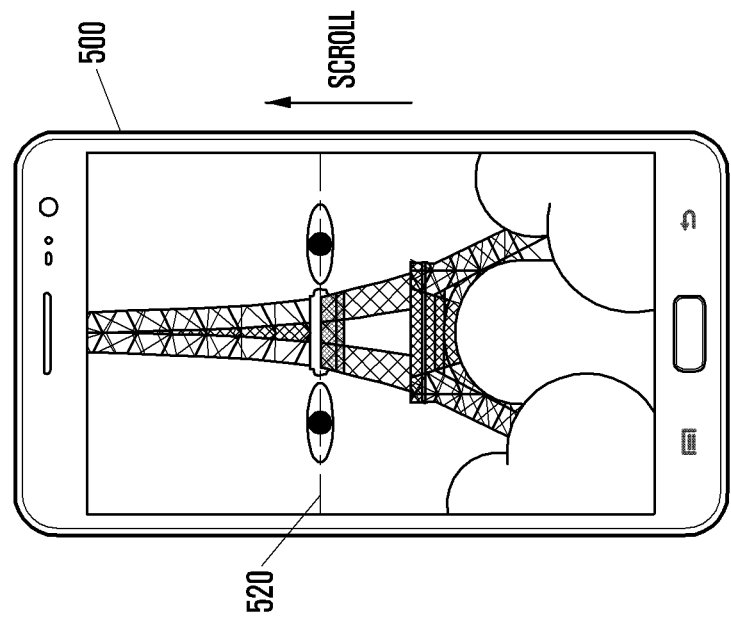
FIGS. 5A, 5B, 5C, 5D, and 5E are diagrams illustrating screen displays for explaining a screen display control method according to an embodiment of the present disclosure.
Figure 5A:
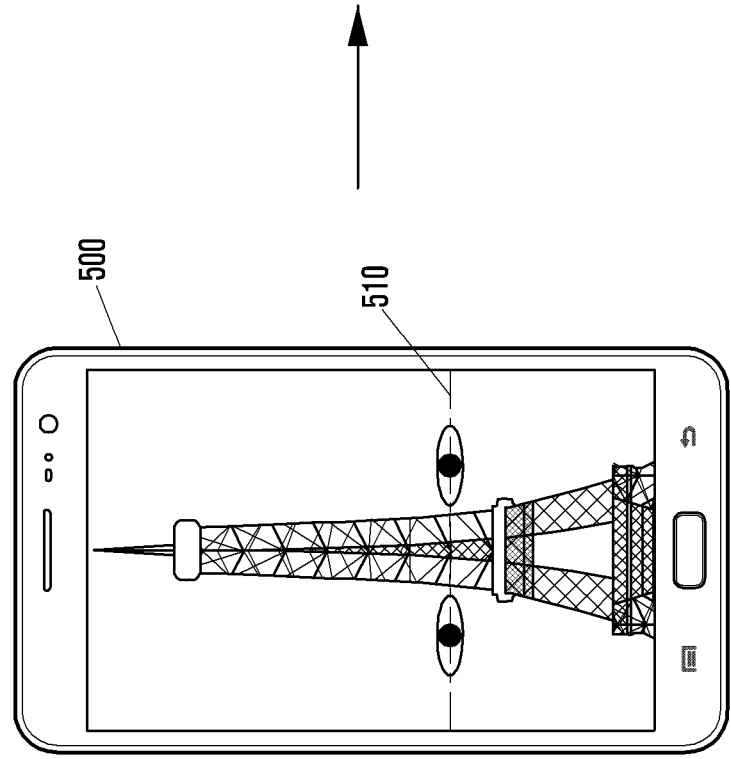

FIG. 5A shows a situation of controlling the screen display in response to a scroll (smart scroll) command. If the smart scroll command is executed, the electronic device 500 invokes the application supporting the scroll. The electronic device may scroll the content displayed on the display unit to the left, right, up, or down in correspondence to the face recognized by the camera. For example, if the first gaze position 510 changes for the second gaze position 520 on the display unit of the electronic device 500, the electronic device 500 scrolls the screen bottom to top on the display unit such that the lower part of the content appears on the screen. The electronic device 500 is capable of detecting a drop of the face or a raise of the face based on at least one of the gaze position, face position, and face angle to determine the scroll direction and/or speed. The electronic device 500 may scroll the screen according to the determined scroll direction and/or speed.

According to various embodiments of the present disclosure, the electronic device 500 may compensate the scroll direction and/or scroll speed based on the sensor data acquired from the sensor. For example, the electronic device 500 determines whether the user's gaze position acquired through the camera corresponds to the display unit using the tilt sensor and, if so, scrolls the screen using only the sensor data. The gyro sensor senses the leaning degree of the electronic device 500 and controls the scroll direction and/or scroll speed according to the leaning degree. For example, if the electronic device 500 leans upward twice in quick motion, the screen may be scrolled upward quickly. At this time, if the electronic device 500 leans download once, the upward scrolling stops. Also, if the electronic device leans downward twice, the upward scroll stops and the downward scroll starts. The user may manually configure at least one of the direction, angle, and speed. If the acquired sensor data corresponds to at least one of the direction, angle, and speed information, the electronic device 500 scrolls the screen according to the at least one of the direction, angle, and speed information.

According to various embodiments, if it is impossible to recognize the face of the user using the camera, the electronic device 500 may acquire the sensor data from the sensor. The electronic device 500 determines whether it is not manipulated by the user based on the sensor data. For example, if it is determined that the electronic device 500 maintains a posture lying flat horizontally as if it is placed on the desk without any input, the electronic device 500 determines that it is not in use. If it is determined that the electronic device is not in use, the electronic device may decrease the frame rate of the camera. If no input is detected in a threshold time, the electronic device 500 stops operating the camera. That is, the electronic device determines whether it is in use based on the sensor data and adjusts the frame rate of the camera to turn off the camera if it is determined that the electronic device 500 is not in use.

Figure 5B:
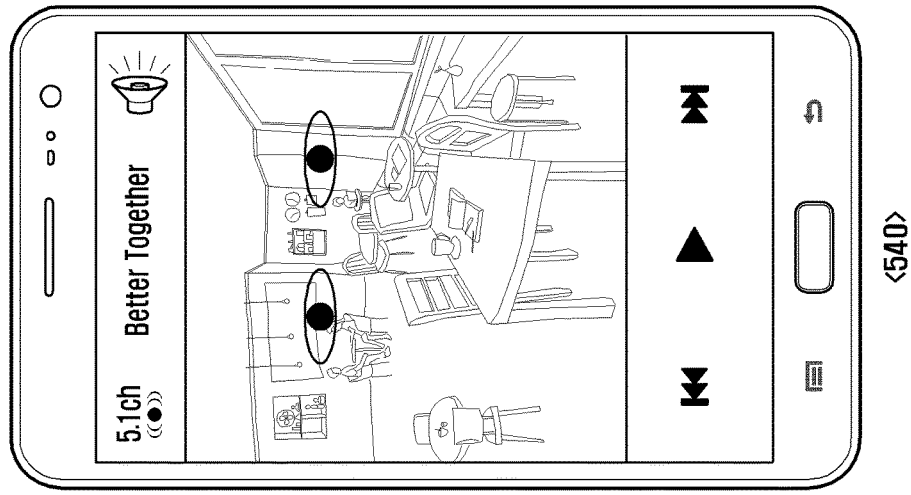
Figure 5B:
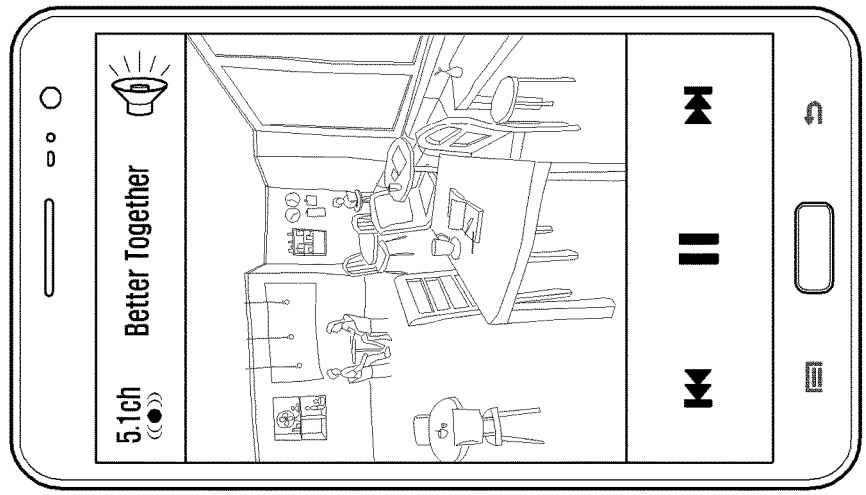

FIG. 5B shows a situation of controlling the screen display in response to a playback (smart play) command. For example, the electronic device 530 may display music content. If the gaze position is on the display unit displaying the music content, the electronic device 540 may play the music content.

Figure 5C:
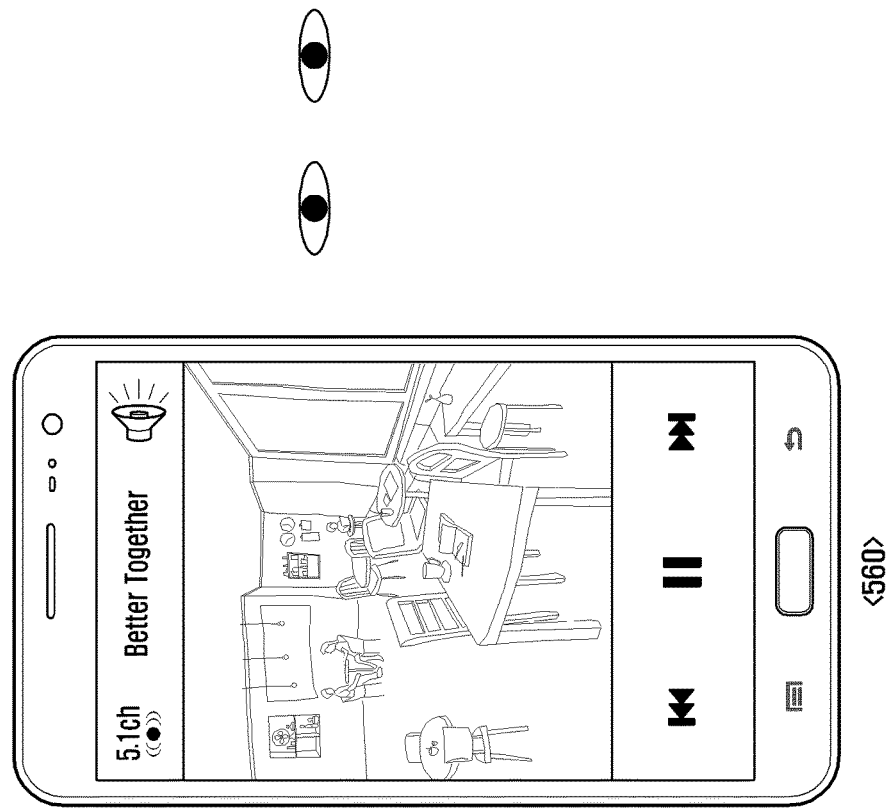
Figure 5C:
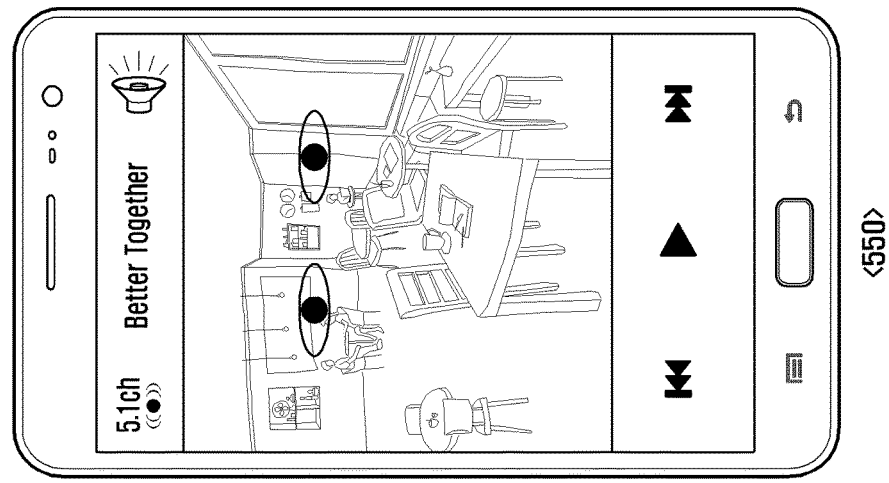

FIG. 5C shows a situation of controlling the screen display in response to a pause (smart pause) command. If the gaze position of the user is on the display unit, the electronic device plays the music content as shown in the screen display 550. In the state of playing the music content, if the gaze position of the user moves out of the display unit, the electronic device pauses the playback of the music content as shown in the screen display 560.

Figure 5D:
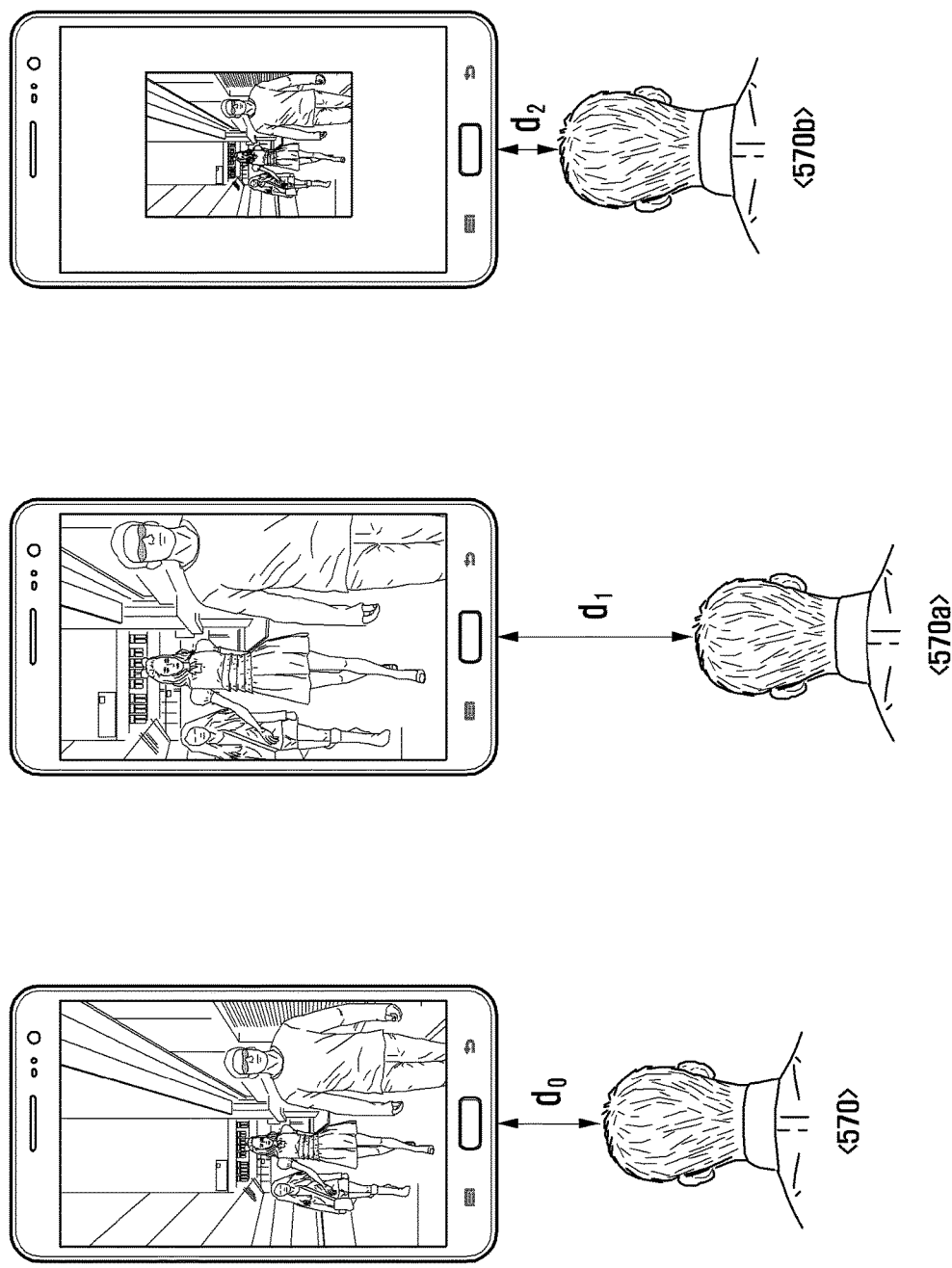

FIG. 5D shows a situation of controlling the screen display in response to a zoom-in (smart zoom-in) or a zoom-out (smart zoom-out) command. The electronic device 570 may zoom in or out the content according to the distance between the gaze position of the user and the display unit. The electronic device 570 may display the content in a threshold distance ($d_0$) between the gaze position and the display unit. If the distance between the gaze position and the display unit ($d_1$) is equal to or greater than the threshold distance ($d_0$) ($d_0 \leq d_1$), the electronic device may zoom in the content as shown in the drawing 570a. If the distance between the gaze position and the display unit ($d_2$) is less than the threshold distance ($d_0$) ($d_0 > d_2$), the electronic device may zoom out the content as shown in the drawing 570b.

Figure 5E:
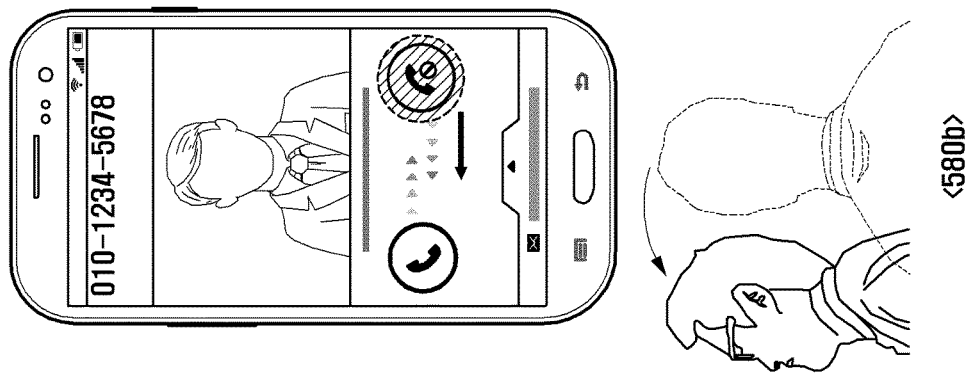
Figure 5E:
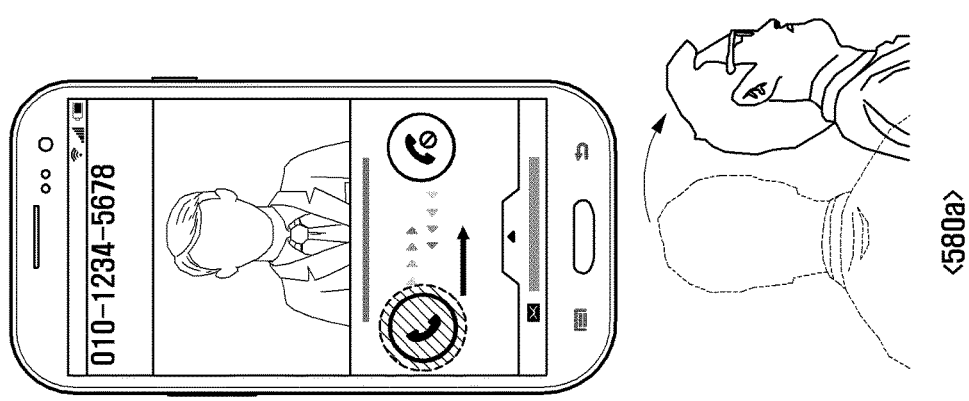

FIG. 5E shows a situation of controlling the screen display in response to a response command. If the gaze position is on the display unit, the electronic device may accept the incoming call as shown in the drawing 580a. That is, if the gaze position moves from left to right as shown in the drawing 580a, the electronic device receives the incoming call (response: yes). Otherwise if the gaze position moves from right to left as shown in the drawing 580b, the electronic device may reject the incoming call (response: no).

According to various embodiments, the electronic device may control the screen display in response to the stay (smart stay) command. The stay command is to instruct to maintain the screen displayed on the display unit of the electronic device as it is turned on. In the case of the stay command, the electronic device requires a wide angle of view and may use the front camera operating in YUV mode to reduce erroneous face recognition probability.

Figure 6B:
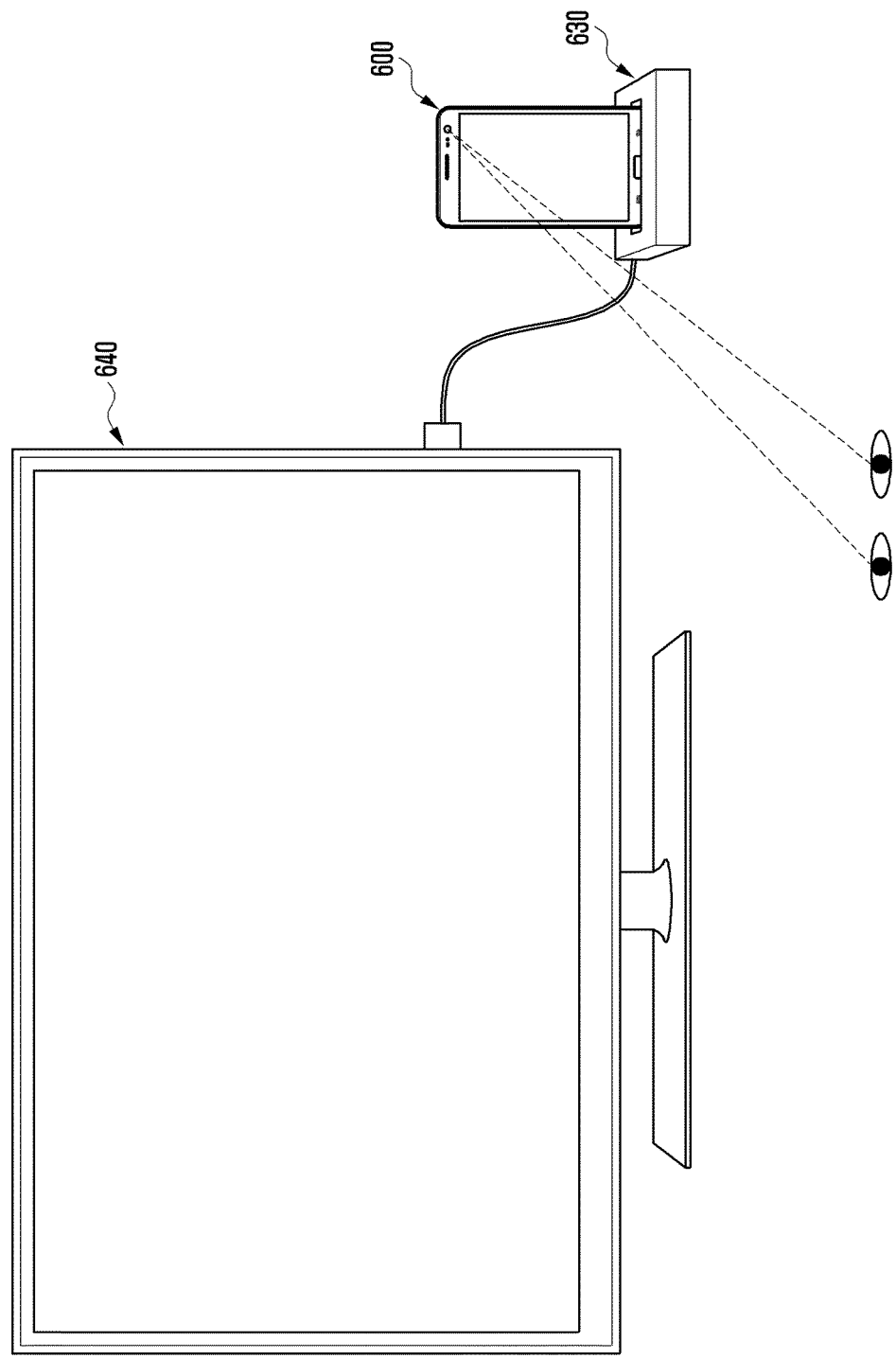

FIGS. 6A and 6B are diagram illustrating a situation of controlling screen display according to an embodiment of the present disclosure.

Referring to FIG. 6A, the electronic device 600 may execute a book application such that the display unit displays a page as shown in the drawing 610. If the motion sensor detects that the electronic device standing erect falls flat on its back as denoted by reference number 600a, the electronic device turns the current page to the next page as shown in the drawing 620. If it is detected that the gaze position of the user is placed on the right edge of the current page, the electronic device 600 may turn the current page to the next page on the display unit.

Referring to FIG. 6B, the electronic device 600 may control the screen display of an external device 640 connected thereto. The external electronic device 640 may be any of all the types of electronic devices connectable from outside of the electronic device 600 such as a television, a computer monitor, a set-top box, a navigator, a speaker, and the like. At this time, the electronic device 600 may be connected with the external electronic device 640 via an external device 630. In the case that the electronic device 600 is connected with the external electronic device 640, it is possible to control the screen display of the external electronic device 640 based on the user's face recognized by means of the camera. For example, if the recognized user's face position is on the external electronic device 640, the electronic device 600 may continue providing the screen data to the external electronic device 640. If the recognized user's face position is output of the display unit and the external electronic device 640, the electronic device 600 may stop playing the content at the external electronic device 640. If the face position is out of the display unit and the external electronic device 640 over a threshold time, the electronic device 600 may turn off the external electronic device 640 or control the external electronic device 640 to enter the power saving mode.

According to various embodiments, if the external electronic device 640 is a speaker, the electronic device 600 may output the voice of a counterpart user of a call through the speaker in the telephony mode. If the external electronic device 640 is a navigation device or an inbuilt car device, the electronic device 600 may detect an emergency situation based on the face and motion of the user. For example, the emergency situation may be one of dozing, diverting attention away from the road, or finding an obstacle on the road. If it is determined that the user is dozing, the electronic device 600 may output an alarm sound or announcement or notify of the situation on the road.

Figure 7:
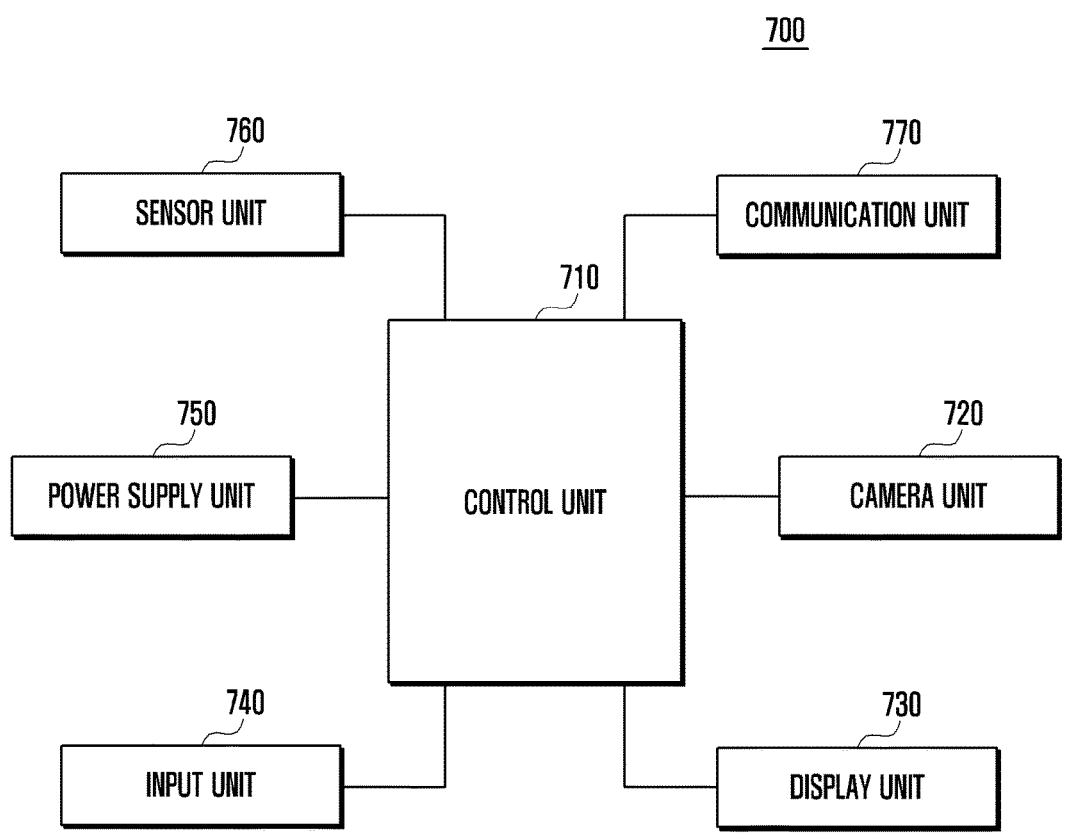
FIG. 7 is a block diagram illustrating a configuration of an electronic device according to an embodiment of the present disclosure.

FIG. 7 is a block diagram illustrating a configuration of an electronic device according to an embodiment of the present disclosure.

Referring to FIG. 7, the electronic device 700 includes a control unit 710, a camera unit 720, a display unit 730, an input unit 740, a power supply unit 750, a sensor unit 760, and a communication unit 770.

The control unit 710 determines the resolution of the camera unit 720. According to various embodiments of the present disclosure, the control unit 710 may set the resolution of the camera unit 720 to higher or low regardless of the power state of the electronic device 700. The control unit 710 may determine whether the electronic device is in the higher power state or low power state depending on whether the power of the electronic device 700 is equal to or greater than a threshold and/or whether the electronic device is connected to an external device. For example, if the power of the electronic device 700 is equal to or greater than the threshold or if the electronic device 700 is connected to the external device, the control unit 710 determines this as the high power state and sets the resolution of the camera unit 720 to high. The external device supplies power to the electronic device 700. If the power of the electronic device 700 is lower than the threshold and if the external device is not connected to the electronic device 700, the control unit 710 determines this as the low power state and sets the resolution of the camera to low. The electronic device is supplied power through the power supply unit 750. The power supply unit may be connected to the external device.

The control unit 710 controls overall operations of the electronic device 700 and signal flows among the internal components of the electronic device 700, processes data, and controls power supply to the components. The control unit 710 includes a Central Processing Unit (CPU) and a Graphic Processing Unit (GPU). As well known in the art, the CPU is a core control unit of the computer system which performs data operation and comparison and command interpretation and execution. The GPU is the graphic control unit of performing graphic data operation and comparison and command interpretation and execution. Each of the CPU and GPU may be integrated into a package of a single integrated circuit including two or more independent cores (e.g. quad-core). The CPU and GPU also may be integrated into a chip in the form of a System on Chip (SoC). The CPU and GPU also may be implemented in the form of multi-layered package. The packaged CPU and GPU may be referred to as Application Processor (AP).

The camera 710 may operate at the determined resolution to recognize the face of the user. According to various embodiments of the present disclosure, the camera unit 720 operates at a high resolution to acquire the gaze position of the user. The camera unit 720 may operate at a low resolution to recognize the face position of the user.

The display unit 730 may display a screen controlled based on the face. The display unit 730 displays an image on the screen under the control of the control unit 710. That is, the control unit 710 processes the data to generate an image fit for the screen (e.g. decoding the data) to the buffer, and the display unit 730 converts the buffered image to analog signals such that the image is presented on the screen. The display unit 730 may be implemented with any of a Liquid Crystal Display (LCD), an Organic Light Emitting Diodes (OLED), an Active Matrix OLED (AMOLED), and a flexible display. According to various embodiments of the present disclosure, the display unit 730 may be integrated with the input unit 740.

The input unit 740 includes a plurality of keys for receiving alphanumeric information and configuring various functions. Examples of the keys include a menu key, a screen on/off key, a power on/off key, a volume control key, etc. The input unit 740 generates user setting and electronic device function control key signals to the control unit 710. Examples of the key signal include a power on/off signal, a volume control signal, a screen on/off signal, a shutter signal, etc. The control unit 710 controls the above components in response to the key signal. The keys constituting the input unit 740 are referred to as hard keys and the keys presented on the display unit 730 are referred to as soft keys.

According to various embodiments, the control unit 710 acquires the coordinate information by mapping the gaze position to the display unit 730 and control the screen display based on the acquired coordinate information. The control unit 710 determines the direction and speed information based on the change in coordinate information and controls the screen display based on the direction and speed information. The control unit 710 also determines whether the user is present or absent using the camera unit 720 operating in the low resolution mode and, if the user is present, changes the configuration value of the camera unit 720 to recognize the face position of the user. The configuration value may be the camera speed, i.e. FPS, or camera sensitivity.

The sensor unit 760 may include at least one of a Motion Sensor, a Gyro Sensor, an Acceleration Sensor, a Humidity Sensor, a Proximity Sensor, an Infrared Sensor, an Illuminance Sensor, an Earth Magnetic Field Sensor, an Inertial Sensor, a Tilt Sensor, and a Blow Sensor. The sensor may acquire the sensor data including at least one or any combination of an angle change, a direction change, a position change, a posture change, a strength change, and a speed change. The sensor detects a motion event occurred by the user so as to acquire the sensor data from at least one or any combination of a pinch zoom, a hand blade touch, and an air motion.

According to various embodiments, the control unit 710 receives the sensor data from the sensor unit 760 to acquire the coordinate information based on the sensor data and the mapping of the face position to the display unit of the electronic device. The control unit 710 determines the direction and speed information based on the change of coordinate information over time. That is, the control unit 710 acquires the coordinate information using the face position and the sensor data and determines the movement direction and speed accurately.

According to various embodiments, if it is determined that the user is present, the control unit 710 activates at least one sensor of the sensor unit 760 and controls the screen display based on the sensor data provided by the sensor unit 760. The control unit 710 determines whether it is possible to acquire image from the camera based on the sensor data and, if so, changes the configuration values of the camera based on the sensor data to recognize the face position of the user. If it is impossible to acquire image from the camera, the control unit 710 stops operating the camera unit 720 and controls the screen display based on the sensor data.

According to various embodiment, the control unit 710 may assign the priorities of the image information acquired using the camera unit 720 and the sensor data. The control unit 710 may control the screen display based on the information sorted in the descending order. For example, if the camera unit 720 operates in the high resolution mode, the control unit 710 may assign a high priority to the image information as compared to the sensor data. Otherwise if the camera unit 720 operates in the low resolution mode, the control unit 710 may assign a low priority to the image information as compared to the sensor data.

In this way, the control unit 710 is capable of controlling the screen display of the display unit 730 in association with at least one of the scroll, playback, pause, zoom-in, zoom-out, stay, and response command.

The electronic device 700 may also function as at least one of an output unit (not shown), a communication unit 770, and a memory (not shown).

The output unit may include a microphone and a speaker. The output unit may input and output an audio signal (e.g. voice data) concerning voice recognition, voice recording, digital recording, and telephony. The output unit converts the audio signal from the control unit 710 to an analog signal (D/A conversion) and amplifies and outputs the signal through the speaker. The output unit convers the audio signal (first sound wave) received through the microphone to the digital signal (A/D conversion) and transfers the digital signal to the control unit 710. The speaker converts the audio signal (sound data) to sound wave. The microphone converts the sound wave generated by a person or other sound source to an audio signal.

The communication unit 770 is responsible for voice, video, and/or data communication with another electronic device through a network under the control of the control unit 710. The communication unit 770 includes a Radio Frequency (RF) transmitter for frequency up-converting and amplifying of the transmission signal and an RF receiver for low noise amplifying and frequency down-converging of the received signal. The communication unit 770 may include a mobile communication module (e.g. $3^{rd}$ Generation (3G) mobile communication module, 3.5G mobile communication module, and 4G mobile communication module), a digital broadcast module (e.g. DMB module, and a short range communication module (e.g. Wi-Fi module, Bluetooth module, and Near Field Communication (NFC) module).

The memory may store software applications concerning the operation of the electronic device 700 and various data received or generated as a result of the operation of the electronic device 700. The memory may be a certain type of digital storage readable and recordable. The memory may store at least one program for executing the above functions. The memory may include a secondary memory unit of the control unit 710 such as disk, Random Access Memory (RAM), Read Only Memory (ROM), and flash memory. The memory may store the information (e.g. contact) generated by the electronic device 700 and the data (e.g. message and motion picture file) received from the outside through the communication unit 770. The memory may store the information on the image (e.g. keypad, motion picture, and message) such as size information and display region information.

As described above, the display control method and apparatus of the present disclosure is advantageous in that the screen display of the electronic device is controlled depending on the presence/absence of the user regardless of the power state of the electronic device so as to improve power utilization efficiency of the electronic device.

Also, the display control method and apparatus of the present disclosure is advantageous in that the electronic device executes the functions affecting power consumption selectively depending on its power state so as to improve power utilization efficiency.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A screen display control method of an electronic device, the method comprising:
   determining a resolution operation mode of a camera, the camera being configured to operate in a high resolution mode by activating all pixels of an image sensor of the camera and a low resolution mode by activating a predetermined number of pixels less than the all pixels of the image sensor of the camera;
   performing a first facial recognition operation when it is determined that the camera is operating in the high resolution mode;
   performing a second facial recognition operation when it is determined that the camera is operating in the low resolution mode; and
   controlling a screen display of the electronic device based on the first facial recognition operation or the second facial recognition operation,
   wherein the first facial recognition operation includes determining a gaze position of a user,
   wherein the second facial recognition operation includes:
      setting first configuration values of the camera,
      determining whether the user is present,
      when the user is present, changing the first configuration values of the camera to a second configuration value, and
      determining a face position of the user with respect to the electronic device while operating the camera in the low resolution mode with the second configuration value, and
   wherein the changing of the first configuration values of the camera to the second configuration value comprises changing at least one of frames per second, a shutter speed, or an exposure value.

2. The method of claim 1, further comprising:
   determining a power state of the electronic device; and
   selecting the high resolution mode or the low resolution mode based on the determined power state of the electronic device.

3. The method of claim 2, wherein the determining of the power state comprises:
   determining, when the power state of the electronic device is equal to or greater than a threshold or the electronic device is connected to an external device, the power state as a high power state; and
   determining, when the power state of the electronic device is less than the threshold value and the electronic device is not connected to the external device, the power state as a low power state.

4. The method of claim 3,
   wherein the high resolution mode is selected when the electronic device is in the high power state, and
   wherein the low resolution mode is selected when the electronic device is in the low power state.

5. The method of claim 1, when the screen display is controlled based on the gaze position, the method further comprising:
   acquiring coordinate information by mapping the gaze position to a display of the electronic device; and
   controlling the screen display further based on the coordinate information.

6. The method of claim 5, further comprising:
   determining at least one of direction information or speed information based on a change of the coordinate information over time; and
   controlling the screen display further based on the direction information or the speed information.

7. The method of claim 1, further comprising:
   acquiring sensor data using at least one sensor;
   acquiring coordinate information through mapping to the display of the electronic device based on the sensor data and the face position;
   determining at least one of direction information and speed information based on a change of the coordinate information; and
   controlling the screen display further based on the at least one of the direction information and the speed information.

8. The method of claim 1, wherein, in the high resolution mode, the method further comprising:
   acquiring sensor data from a sensor;
   assigning priorities to image information provided by the camera and the sensor data; and
   controlling the screen display further using the image information sorted in a descending order of the priorities.

9. The method of claim 1, wherein the controlling of the screen display comprises controlling at least one of scroll, playback, pause, zoom-in, zoom-out, stay, and response control operations in association with the screen display.

10. An electronic device comprising:
    a camera configured to operate in a plurality of resolution operation modes, the plurality of resolution operation modes including a high resolution mode based on an activation of all pixels of an image sensor of the camera and a low resolution mode based on an activation of a predetermined number of pixels less than the all pixels of the image sensor of the camera;
    a display configured to display a screen; and
    at least one processor configured to:
       determine the resolution operation mode of the camera,
       perform a first facial recognition operation when it is determined that the camera is operating in the high resolution mode,
       perform a second facial recognition operation when it is determined that the camera is operating in the low resolution mode, and
       control the display based on the first facial recognition operation or the second facial recognition operation,
    wherein the first facial recognition operation includes determining a gaze position of a user,
    wherein the second facial recognition operation includes:
       setting first configuration values of the camera,
       determining whether the user is present,
       when the user is present, changing the first configuration values of the camera to a second configuration value, and determining a face position of the user with respect to the electronic device while operating the camera in the low resolution mode with the second configuration value, and wherein the changing of the first configuration values of the camera to the second configuration value comprises changing at least one of frames per second, a shutter speed or an exposure value.

11. The electronic device of claim 10, wherein the at least one processor is further configured to:

determine a power state of the electronic device as one of a high power state and a low power state based on whether power of the electronic device is equal to or greater than a threshold or whether the electronic device is connected to an external device, and select the high resolution mode of the camera when the electronic device is in the high power state and the low resolution mode when the electronic device is in the low power state.

12. The electronic device of claim 10, wherein the at least one processor is further configured to:

operate the camera in the high resolution mode to acquire coordinate information by mapping the gaze position to the display of the electronic device, and control the screen further based on the coordinate information.

13. The electronic device of claim 10, further comprising:

at least one sensor configured to provide sensor data, wherein the at least one processor is further configured to:

acquire coordinate information through mapping to the display of the electronic device based on the sensor data and the face position, determine at least one of direction information or speed information based on change of the coordinate information, and control the screen further based on the at least one of the direction or speed information.

14. The electronic device of claim 10, wherein, in the high resolution mode, the electronic device further comprising:

at least one sensor configured to provide sensor data, wherein the at least one processor is further configured to:

assign priorities to image information provided by the camera and the sensor data, and control the screen further using the image information sorted in a descending order of the priorities.

15. The electronic device of claim 10, wherein the at least one processor is further configured to control at least one of scroll, playback, pause, zoom-in, zoom-out, stay, and response control operations in association with the screen.

* * * * *